3,320,121
2 - (2',2' - DIHALOCYCLOPROPYL) - 1,1 - DIHALO-CYCLOPROPANE AND 2,2 - DIHALOCYCLOPROPYL CARBOXYLIC ACID AS ANTIBACTERIAL AGENTS

John D. Douros, Jr., Fanwood, N.J., assignor to Sun Oil Company, Philadelphia, Pa., a corporation of New Jersey
No Drawing. Filed Nov. 21, 1963, Ser. No. 325,485
9 Claims. (Cl. 167—30)

This invention relates to a method for preventing or inhibiting the growth of bacteria, and to bactericidal and bacteriostatic compositions effective for this purpose.

The processes and compositions of this invention for killing or inhibiting the growth of bacteria are of great utility in virtually all phases of agriculture, animal husbandry, and pharmaceutical fields, and particularly in the control of gram negative pathogenic bacteria which cause serious economic loss amongst domestic animals.

According to this invention, it has now been found that certain dihalocyclopropyl compounds, and more particularly 2-(2',2'-dihalocyclopropyl)-1,1-dihalocyclopropane and 2,2-dihalocyclopropane carboxylic acid, wherein the halo groups are chloro or bromo, when present in effective quantities are very active bactericides at low concentrations. These compounds, it has been discovered, inhibit the growth of a wide variety of bacteria, as for example, those of the genera Salmonella, Shigella, Vibrio, Escherichia, Pseudomonas and the like, and particularly those species which cause diseases in animals, such as *Salmonella typhimirium*, which causes typhoid fever, *Salmonella gallinarum*, which causes dysentery in chickens, and *Pseudomonas aeruginosa*, which causes septicemias in animals.

The dihalocyclopropyl compounds of this invention are potent anti-bacterials both in vitro and in vivo at concentrations of 80 µg./ml. and above, and as such may be applied in various ways, not only to infections of animals, but also to plants which are affected by bacterial infections, especially various rots caused by bacteria of the genera Pseudomonas and Erwinia.

These anti-bacterial compounds may be formulated in a number of ways. When used on plants, the compound is preferably presented in the form of dust compositions, wettable powders, or emulsives. As a dust, the compound may be dispersed in a powdered solid carrier such as talc, soapstone, Attapulgus clay, as well as other finely divided solids known in the dusting art. When formulated as a wettable powder, the active component may be employed in conjunction with inert fillers which may be of the clay-type carrier or iron clay-type, in conjunction with various combinations of wetting agents and emulsifiers which permit the adaptation of the concentrate as a free-flowing powder for aqueous dilution in the field.

It will be recognized by those skilled in the art that the above formulations, with slight modifications, can also be used in the field of animal husbandry as a dusting powder, or for the introduction into feedstuffs such as poultry feed, especially since poultry is highly susceptible to fowl typhoid caused by species of the genus Salmonella.

Because of their high in vitro anti-bacterial activity, the compounds of this invention can be formulated as salves, ointments or like preparations for topical administration in the treatment of burns, bacterially induced inflammations such as abscesses, dermatitis, rashes, and the like, especially in domestic animals. Thees formualtions can contain other therapeutically valuable supplements such as local anaesthetics, irradiated oils, and other medicinal substances. When used for these or similar purposes, the dihalocyclopropyl compounds of this invention may be incorporated in any therapeutically acceptable carrier such as bland oils, petrolatum or like topical bases, desirably together with adjuvants comprising surface active agents, detergents, dispersing agents, stabilizers, and other modifiers which facilitate the handling and application of these anti-bacterial materials.

Alternatively, the dihalocyclopropyl anti-bacterials of this invention may be administered in vivo by injection in a physiologically acceptable carrier, e.g. a saline solution or an oil such as corn oil, preferably admixed with an enzyme such as mucin or the like.

In all cases of in vivo and in vitro application, the dihalocyclopropyl compounds of this invention are active at very low concentrations; however, it is difficult to predict with precision what in all cases constitutes a therapeutic dose, even on a weight basis. Variable factors such as type, duration and severity of infection, mode of administration, among others, are determining factors.

Thus, for example, as shown below, in the in vivo tests, 50% protection against Salmonella can be obtained by 100 mg. of material per kilogram of body weight of test animal by injection.

The preparation of the dihalocyclopropyl compounds of the present invention may follow any conventional procedure, and for purposes of illustration the following methods are presented:

Preparation of 2-(2',2'-dichlorocyclopropyl)-1,1-dichlorocyclopropane: to 54 g. butadiene (1.0 mole) dissolved in 50 ml. hexane @ —10° C. is added 27 g. (0.5 mole) of finely divided sodium methoxide. 59 g. (0.5 mole) of chloroform is added dropwise over a period of 2 hours while stirring vigorously. The mixture is stirred for 4 hours more at —10° C. and is then brought slowly to room temperature. 200 ml. of water is added and the mixture extracted with ether. The extract is dried over $MgSO_4$, and the mono-adduct of dichlorocarbene with butadiene is recovered by fractional distillation, whereby the ether and hexane are stripped off. The above procedure is then repeated by reacting the mono-adduct product with chloroform in the presence of sodium methoxide in hexane solvent. Following the addition of water and extraction of the mixture with ether, the extract is again dried over $MgSO_4$, and the ether and hexane are stripped off. The product is an oil which is a mixture of the mono- and di-adducts of dichlorocarbene with butadiene. These can be separated by normal crystallization techniques to recover 2-(2',2'-dichlorocyclopropyl)-1,1-dichlorocyclopropane.

Preparation of 2,2-dichlorocyclopropane carboxylic acid: to 86 g. (1.0 mole) of methyl acrylate in 50 ml. of hexane at 0° C. is added 13.5 g. (0.25 mole) of sodium methoxide. 29.5 g. (.25 mole) of chloroform is added dropwise during 2 hours while stirring vigorously at 0° C. The mixture is stirred at this temperature for 4 more hours and then brought slowly to room temperature. 200 ml. of water is added and the mixture acidified with 1 N HCl and then extracted with ether. The extract is dried over MgSO$_4$ and the ether and hexane stripped off. The resultant oil is then saponified with aqueous NaOH, followed by acidification with 1 N HCl and extraction with ether. The extract is again dried over MgSO$_4$, and the ether and hexane stripped off.

EXAMPLE I

The in vitro effectiveness of the dihalocyclopropyl compounds of this invention against bacteria of the genera Salmonella, Shigella and Vibrio are demonstrated by the following tests:

One loopful of each of *Salmonella typhimurium*, *Shigella gallinarum*, and *Vibrio comma* is transferred from agar slants to 10 ml. of trypticase soy broth and incubated at 37° C. for 18 hours. At the end of this time the bacteria are seeded into the same medium (plus 2% agar) in which the inoculum is prepared. The bacteria are seeded at 1 ml. of inoculum per 250 ml. of medium. The resultant mixture is poured into a heat-resistant baking dish at a temperature of 45° C. Analytical filter paper discs of ½" diameter are used for the agar diffusion technique. Each dish is saturated with 0.08 ml. of the solubilized test compound (100 μg./disc) and placed on the surface of the hardened agar. The plates are incubated at 37° C. for 18 hours. The activity of the compounds is established by measuring the zone of inhibition in mm. The larger the size of the zone of inhibition, the more potent the anti-bacterial activity of the test compounds. Untreated controls used as a basis for comparison contained a profuse growth of bacteria. The results of these tests are as follows:

TABLE I

| Compound | Microorganism | Zone of Inhibition in mm. |
|---|---|---|
| 2-(2',2'-dichlorocyclopropyl)-1,1-dichlorocyclopropane. | *Salmonella typhimurium*. | 17 |
| 2,2-dichlorocyclopropane carboxylic acid. | do | 14 |
| 2-(2',2'-dichlorocyclopropyl)-1,1-dichlorocyclopropane. | *Vibrio comma* | 18 |
| 2,2-dibromocyclopropyl carboxylic acid. | do | 14 |
| 2-(2',2'-dichlorocyclopropyl)-1,1-dichlorocyclopropane. | *Shigella gallinarum* | 17 |
| 2,2-dibromocyclopropyl carboxylic acid. | do | 15 |

The above in vitro results indicate the anti-bacterial value of the compounds of this invention for topical use not only in salves and ointments, but also in plants and against plant virus infections.

EXAMPLE II

The in vivo effectiveness of the dihalocyclopropyl compounds of this invention against the test organisms, *Salmonella typhimurium* and *Vibrio comma* are demonstrated by the following tests:

Mice are used as the test animal. All inoculations are made intraperitoneally, each mouse receiving 10$^3$ organisms per ml. The dihalocyclopropyl compounds are dissolved in physiological saline solution (0.85%) and a single dose injected into the mice four hours after receiving the test organism.

Ten groups of mice are used, each group containing six mice. Three groups of mice are used to evaluate 2-(2',2'-dichlorocyclopropyl) - 1,1 - dichlorocyclopropane against *S. typhimurium* at varied dosage levels; one group is used to evaluate 2,2-dibromocyclopropane carboxylic acid against *Vibrio comma*; five groups are used as controls. The results, as shown below, are determined after 11 days:

TABLE II

| Compound | Dose (mg./kg. body wt.) | Microorganism | Survivors/Total |
|---|---|---|---|
| 2-(2',2'-dichlorocyclopropyl)-1,1-dichlorocyclopropane. | 10 | *Salmonella typhimurium*. | 1/6 |
| Do | 30 | do | 1/6 |
| Do | 100 | do | 3/6 |
| Do | 10 | None | 6/6 |
| Do | 30 | do | 5/6 |
| Do | 100 | do | 6/6 |
| None | None | *Salmonella typhimurium*. | 0/6 |
| 2,2-dibromocyclopropyl carboxylic acid. | 100 | *Vibrio comma* | 4/6 |
| Do | 100 | None | 6/6 |
| None | None | *Vibrio comma* | 0/6 |

As can be seen from the above data, the compounds of this invention gives 50% protection against *S. typhimurium* at 100 mg. of compound per kilogram of body weight of test animal as compared to untreated controls, and 66% protection against *Vibrio comma*.

The invention claimed is:

1. A method of inhibiting the growth of bacteria which comprises contacting said bacteria with a bactericide selected from the group consisting of 2-(2',2',-dihalocyclopropyl)-1,1-dihalocyclopropane and 2,2-dihalocyclopropyl carboxylic acid, wherein the halo substituent is selected from the group consisting of chloro and bromo, in an amount effective to inhibit the growth of said bacteria.

2. The method of claim 1 wherein the bactericide is 2-(2',2',-dichlorocyclopropyl)-1,1-dichlorocyclopropane.

3. The method of claim 1 wherein the bacteria are of the genus Salmonella.

4. The method of claim 1 wherein the bacteria are of the genus Shigella.

5. The method of combatting bacterial infection which comprises administering a bacteria-growth inhibiting amount of a bactericide selected from the group consisting of 2-(2',2',-dihalocyclopropyl) - 1,1 - dihalocyclopropane and 2,2-dihalocyclopropyl carboxylic acid, wherein the halo substituent is selected from the group consisting of chloro and bromo, to an animal infected with a bacterial infection.

6. The method of claim 5 wherein the bactericide is 2-(2',2',-dichlorocyclopropyl)-1,1-dichlorocyclopropane.

7. The method of claim 5 wherein the bacteria are of the genus Salmonella.

8. A method of inhibiting the growth of bacteria which comprises contacting said bacteria with a bacteria-growth inhibiting amount of a bactericide together with a pharmaceutically acceptable carrier, said bactericide selected from the group consisting of 2-(2',2',-dihalocyclopropyl)-1,1-dihalocyclopropane and 2,2-dihalocyclopropyl carboxylic acid, wherein the halo substituent is selected from the group consisting of chloro and bromo, in an amount effective to inhibit the growth of said bacteria.

9. A method of combatting bacterial infection which comprises administering a bacteria-growth inhibiting amount of a bactericide together with a pharmaceutically acceptable carrier said bactericide selected from the group consisting of 2-(2',2',-dihalocyclopropyl)-1,1-dihalocyclopropane and 2,2-dihalocyclopropyl carboxylic acid, wherein the halo substituent is selected from the group consisting of chloro and bromo, to an animal infected with a bacterial infection.

References Cited by the Examiner

Chemical Abstracts, vol. 51: column 13774g (1957).
Chemical Abstracts, vol. 54: column 6570b (1960).

ALBERT T. MEYERS, *Primary Examiner*.

JULIAN S. LEVITT, *Examiner*.

VERA C. CLARKE, *Assistant Examiner*.